United States Patent
Park et al.

(10) Patent No.: US 6,643,520 B1
(45) Date of Patent: Nov. 4, 2003

(54) DEVICE AND METHOD FOR CONTROLLING INITIAL TRANSMISSION POWER OF FORWARD LINK CHANNEL IN MOBILE COMMUNICATIONS SYSTEM

(75) Inventors: Jin-Soo Park, Seoul (KR); Jae-Min Ahn, Seoul (KR); Young-Ky Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/366,013

(22) Filed: Aug. 2, 1999

(30) Foreign Application Priority Data

Aug. 1, 1998 (KR) ............................................ 98-31648

(51) Int. Cl.⁷ ................................................ H04Q 7/20
(52) U.S. Cl. ........................ 455/522; 455/69; 455/13.4
(58) Field of Search ........................ 455/13.4, 511–515, 455/522, 69, 70, 571, 572, 574, 127, 136, 138, 67.1, 423; 370/318, 252, 320, 342, 441; 375/136, 146, 367

(56) References Cited

U.S. PATENT DOCUMENTS

| | | | |
|---|---|---|---|
| 5,056,109 A | | 10/1991 | Gilhousen et al. |
| 5,487,180 A | * | 1/1996 | Ohtake ........................ 455/522 |
| 5,666,654 A | * | 9/1997 | Kanai .......................... 455/512 |
| 5,799,005 A | * | 8/1998 | Soliman ...................... 370/335 |
| 5,940,743 A | * | 8/1999 | Sunay et al. .................. 455/69 |
| 5,982,760 A | * | 11/1999 | Chen ............................ 370/335 |
| 5,983,099 A | * | 11/1999 | Yao et al. .................... 455/426 |
| 6,006,093 A | * | 12/1999 | Aalto et al. .................. 455/443 |
| 6,075,974 A | * | 6/2000 | Saints et al. .................. 455/69 |
| 6,078,572 A | * | 6/2000 | Tanno et al. ................ 370/335 |
| 6,147,981 A | * | 11/2000 | Prescott ...................... 370/200 |
| 6,160,999 A | * | 12/2000 | Chheda et al. ................ 455/69 |
| 6,175,744 B1 | * | 1/2001 | Esmailzadeh et al. ....... 455/522 |
| 6,175,745 B1 | * | 1/2001 | Bringby et al. .............. 455/522 |
| 6,216,004 B1 | * | 4/2001 | Tiedemann, Jr. et al. ... 455/442 |
| 6,263,207 B1 | * | 7/2001 | Kito ............................ 455/453 |
| 6,272,354 B1 | * | 8/2001 | Saario ......................... 455/522 |
| 6,292,471 B1 | | 9/2001 | Cao et al. |

FOREIGN PATENT DOCUMENTS

| | | |
|---|---|---|
| EP | 0 682 418 | 5/1995 |
| WO | WO 98/00928 | 1/1998 |

OTHER PUBLICATIONS

First Office Action of The Patent Office of the People's Republic of China dated Jun. 14, 2002 issued in Chinese Appln. No. 9980 1290.4.
Russian Office Action dated Feb. 19, 2002 issued in counterpart application, namely Appln. No. 20001108489/09.
A.S. Nemirovsky et al., "Communication Systems and Relay Lines", M., "Communications", 1980, p. 317.
M.Y. Vugostskiy, "Elementary Mathematics Reference Book", State Publishing Facility of Technical Literature, Moscow, 1950, pp. 116–117.

* cited by examiner

*Primary Examiner*—Lee Nguyen
*Assistant Examiner*—Jean A Gelin
(74) *Attorney, Agent, or Firm*—Dilworth & Barrese, LLP

(57) ABSTRACT

Devices and methods are provided for determining an initial transmission power for a forward link channel transmitter of a base station in a mobile communications system. A preferred method includes the steps of measuring, at a mobile station, the strength of a specified forward link channel signal received from the base station and sending information indicative of the strength of the specified forward link channel signal to the base station; and determining, at the base station, the initial transmission power for the specified forward link channel signal according to the information received from the mobile station and using the determined transmission power for controlling an initial transmission power for an other forward link channel.

43 Claims, 8 Drawing Sheets

DEVICE AND METHOD FOR CONTROLLING INITIAL TRANSMISSION POWER OF FORWARD LINK CHANNEL IN MOBILE COMMUNICATIONS SYSTEM

BACKGROUND OF THE INVENTION

1. Field of the Invention

The present invention relates generally to a mobile communications system and, more particularly, to a device and method for determining initial transmission power for a forward link channel on which a base station transmits a signal to a mobile station in a mobile communications system.

2. Description of the Related Art

Referring to FIG. 1, there is a diagram illustrating a situation where the initial transmission power for a new forward link channel must be determined. A base station (BS) transmits a reference pilot channel and other channels to a mobile station (MS), and the mobile station transmits an access channel, a reverse pilot channel and other channels to the base station. In order that the base station transmits a new channel to the mobile station, it is necessary for the base station to determine the initial transmission power for the forward link channel. The term "the other channels" as used herein refers to traffic channels and control channels and the term "traffic channels" refers to channels for transmitting data and voice information.

In the conventional related art mobile communications system, the base station sets the initial transmission power for the forward link channel to a fixed value irrespective of the channel condition. Here, there are some cases where the base station uses a higher transmission power than is needed, because surplus power is required to allow the mobile stations to receive specified information in all situations. Therefore, the related art power control method has the effect of increasing forward link interference, especially, interference between adjacent cells by not determining transmission power according to the channel condition. This results in deterioration of the receiving performance at the mobile stations and inefficient utility of power at the base station. Accordingly, the related art power control method is problematic in that the base station for the mobile communications system cannot determine the initial transmission power to an optimum value at a point of time it starts to transmit traffic channels or control channels to a specified mobile station.

SUMMARY OF THE INVENTION

It is, therefore, an object of the present invention to provide a device and method for determining initial transmission power for a forward link channel in a mobile communications system.

It is another object of the present invention to provide a device and method for determining initial transmission power for a forward link channel in a mobile communications system, in which a mobile station measures the strength of a specified channel signal transmitted by the base station and a base station determines the initial transmission power for a forward link channel signal according to the measured value received from the mobile station.

It is further another object of the present invention to provide a device and method for determining initial transmission power for a forward link channel in a mobile communications system, in which a base station measures the strength of a specified channel signal transmitted by the mobile station and determines the initial transmission power for a forward link channel signal.

It is still further another object of the present invention to provide a device and method for determining initial transmission power for a forward link channel according to a data rate in a mobile communications system.

It is still further another object of the present invention to provide a device and method for determining initial transmission power for a forward link channel in a mobile communications system, in which a base station measures the strength of a reverse link pilot channel signal to determine the initial transmission power for the forward link channel at a point of time it starts to transmit traffic channels or control channels to the mobile station.

It is still further another object of the present invention to provide a device and method for determining initial transmission power for a forward link channel in a mobile communications system, in which a base station determines the initial transmission power for the forward link channel according to the strength of a pilot channel signal reported by a mobile station at a point of time it starts to transmit traffic channels or control channels to the mobile station.

BRIEF DESCRIPTION OF THE DRAWINGS

The above and other objects, features and advantages of the present invention will become more apparent from the following detailed description when taken in conjunction with the accompanying drawings in which like reference numerals indicate like parts. In the drawings.

DETAILED DESCRIPTION OF THE PREFERRED EMBODIMENTS

Figure 1:
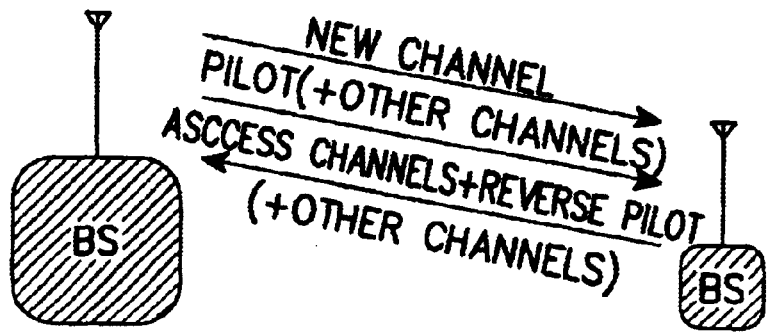
FIG. 1 is a diagram illustrating a situation where it is required to determine an initial transmission power for a forward link channel.

Hereinafter, reference will be made in connection with the accompanying drawings as to a detailed description of a method for determining an initial transmission power for a forward link channel in accordance with preferred embodiments of the present invention.

First, in a mobile communications system, information used to determine the initial transmission power for the forward link channel includes a ratio "(Ec/Io)_pilot_rx" of the energy Ec pilot received pilot chip measured by a mobile station to the total received power spectral density Io, or a ratio "(Eb/Nt)_pilot_rx" of the energy Eb per received pilot bit to the total received noise power spectral density Nt, a ratio "(Ec/Ior)_pilot_tx" of the energy Ec per transmit pilot chip of a base station to the total transmission power spectral density Ior, a required data rate, a ratio "(Eb/Nt)_required" of a required energy Eb per signal bit to the noise power spectral density Nt, reverse link pilot channel received power measured by the base station, and reverse link pilot channel transmission power of the mobile station.

Here, the ratio "(Ec/Io)_pilot_rx" of the energy per received pilot chip measured by the mobile station to the total received power spectral density, or the ratio "(Eb/Nt)_pilot_rx" of the energy per received pilot bit to the total received noise power spectral density, and a reverse pilot transmission power of the mobile station are information the mobile station can report to the base station through an access channel. And, the ratio "(Ec/Ior)_pilot_tx" of the energy per pilot transmission chip of the base station to the total transmission power spectral density, the required data rate, the corresponding ratio "(Eb/Nt)_required" of a required energy per traffic signal bit to the noise power spectral density, and a reverse link pilot received power measured by the base station are information that belongs to the base station. The base station can determine the initial transmission power for the forward link channel using the above information.

In a first embodiment of the present invention, the base station transmits a reference pilot channel to the mobile station with a fixed power. Then, the mobile station measures the strength of a pilot signal and reports the measured value to the base station on an access channel. Based on the reported strength of the pilot signal, the base station determines the initial transmission power for a new traffic channel or control channel. As an example, the base station can start to transmit the forward link channel with the initial transmission power as determined above may be found in the procedure of call processing, where the base station starts to transmit a traffic channel or a control channel responsively upon receiving a message on the access channel from the mobile station.

Here, the message on the access channel may be an origination message in the call origination procedure and a page response message in the call termination procedure. The message on the traffic channel may be a Null traffic channel message that is transmitted without substantial data at the earlier stage. In the embodiment of the present invention, the channel for which the initial transmission power is determined may be a traffic channel or a control channel. Here, the control channel may be a paging channel.

The access channel used to report the strength of a pilot signal can be replaced by another reverse link channel currently being used, in a case of, for example, soft hand-off in which additional channels are used. It is also possible to determine initial transmission power even for channels that resume transmission.

Figure 2:
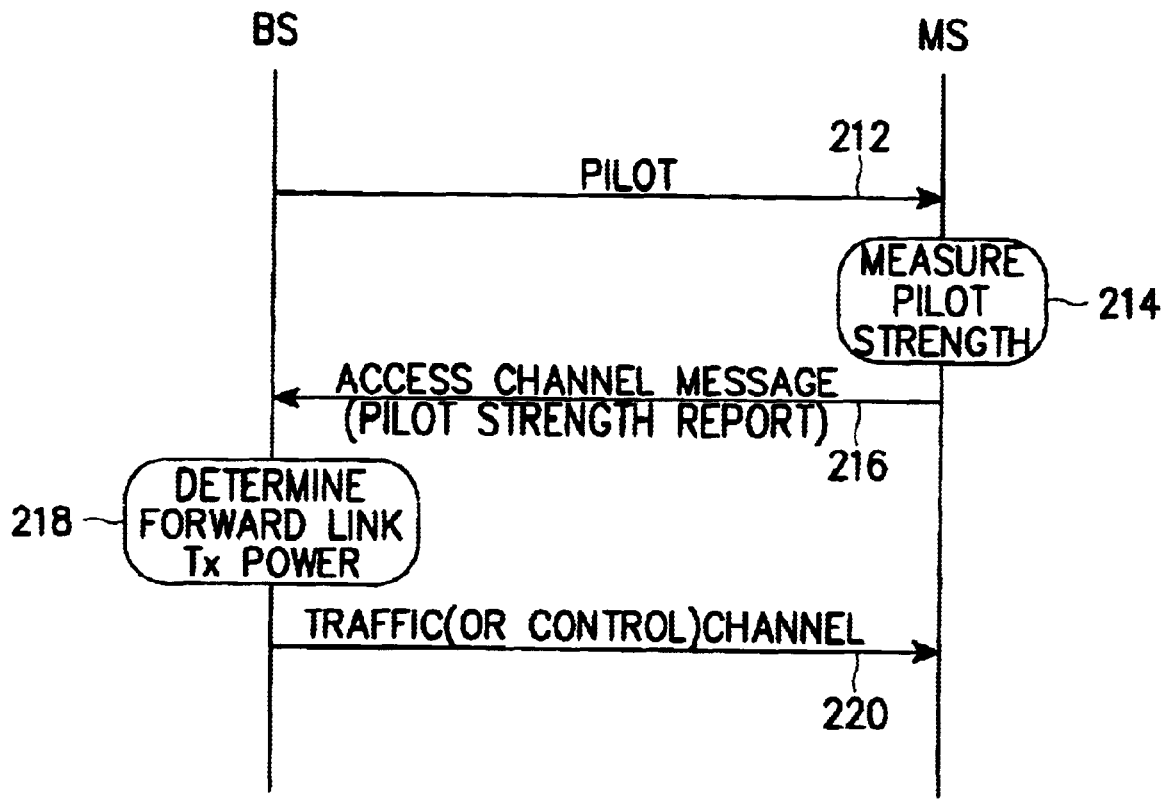
FIG. 2 is a diagram illustrating a procedure for determining the initial transmission power using the strength of a forward link pilot channel signal in a mobile communications system.

FIG. 2 is a diagram illustrating a procedure for determining the initial transmission power for a traffic or control channel using the strength of a forward link pilot channel signal prior to initial transmission of the traffic or control channel. Referring to FIG. 2, a base station transmits a fixed forward link pilot channel signal to a mobile station in step 212. The mobile station measures the received strength of the pilot channel signal and the total received power of the entire signals in step 214. Then, the mobile station generates an access channel message including the received strength of the pilot channel signal and sends it to the base station on an access channel, in step 216. Then, in step 218, the base station compares the transmission strength of the pilot channel signal transmitted to the mobile station in step 212 with the received strength of the pilot channel signal received from the mobile station in step 216 to determine the initial transmission power for a signal to be sent to the mobile station on the forward link channel. In step 220, the base station sends the signal on the forward link channel with the initial transmission power determined above. Here, the forward link channel may be a traffic channel or a control channel.

As illustrated in FIG. 2, the mobile station receives the pilot channel signal from the base station and measures the received energy Ec of the pilot channel signal per chip and the total received power spectral density Io of the entire signals, to calculate the strength for the pilot channel given by Ec/Io. The strength of the pilot channel thus calculated is sent to the base station on the access channel message. Then, the base station determines the initial transmission power for a forward link traffic or control channel signal based on the strength of the pilot channel that is reported by the mobile station.

Figure 3:
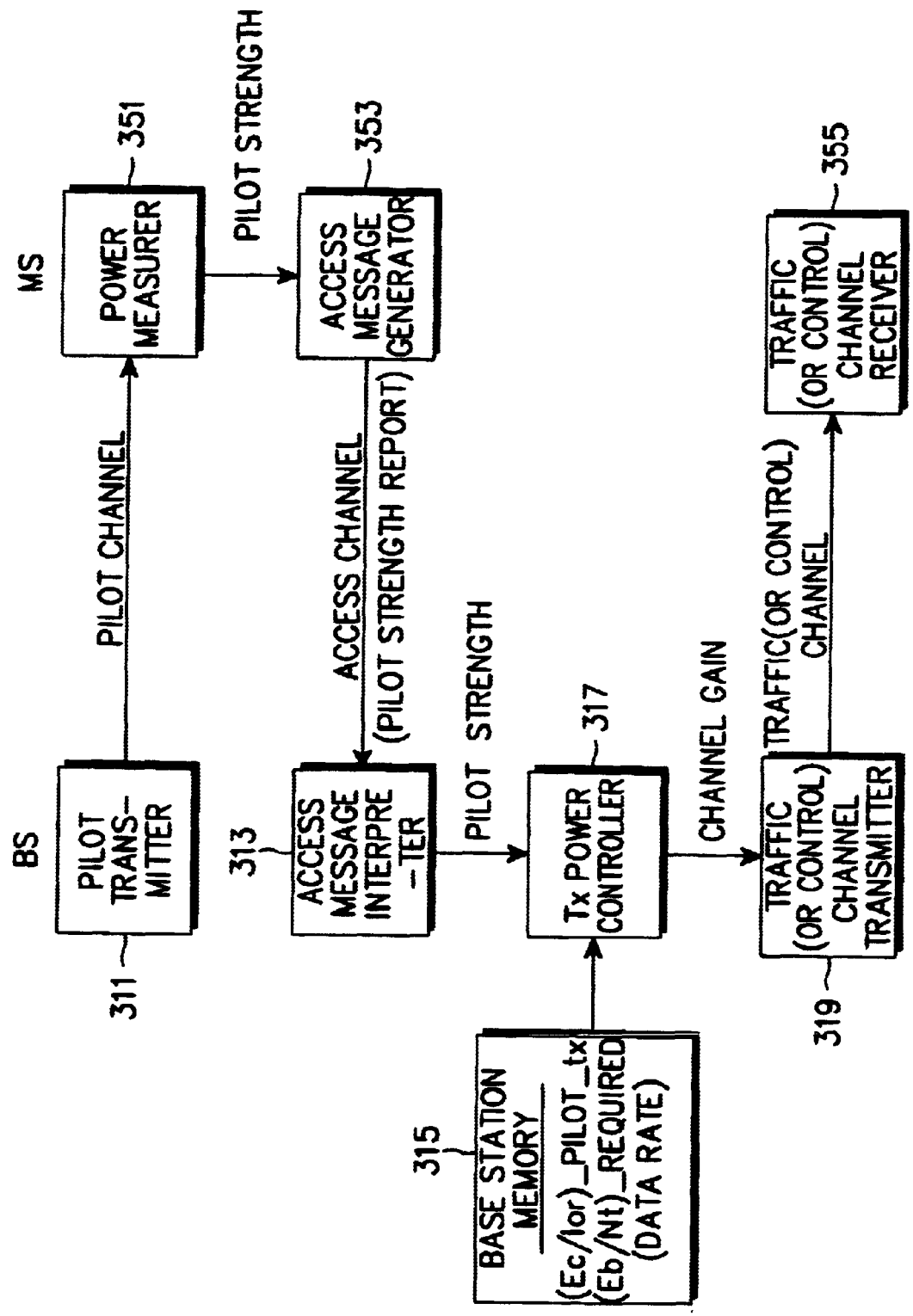
FIG. 3 is a schematic diagram of a device for determining the initial transmission power using the strength of the forward link pilot channel signal according to the procedure of FIG. 2.

FIG. 3 is a schematic diagram of a device for determining the initial transmission power for a forward link channel using the strength of a forward link pilot channel signal. Referring to FIG. 3, a pilot channel transmitter 311 at the base station transmits a forward link pilot channel signal with a fixed power. Then, a power measurer 351 of a receiver at the mobile station measures the received power of the pilot channel signal and the total received power of the entire signals.

Figure 4:
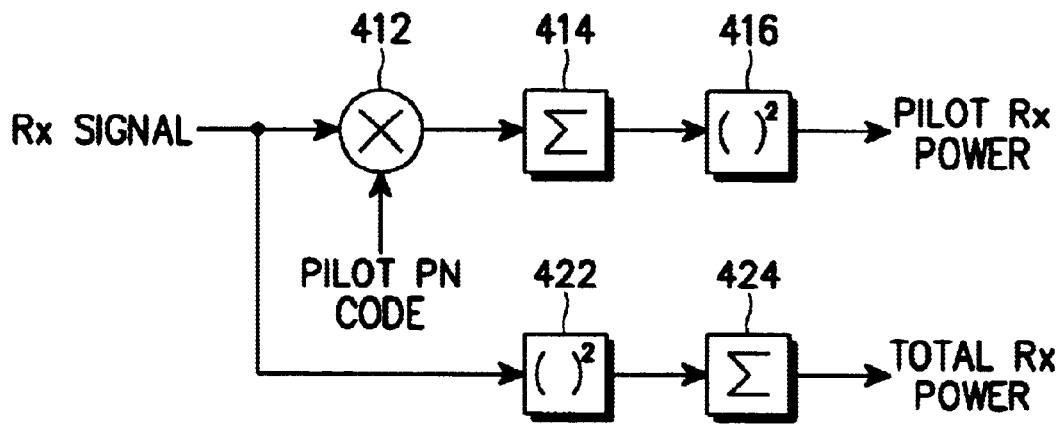
FIG. 4 is a schematic diagram of a power measurer for detecting power of a received signal at a mobile station as shown in FIG. 3.

A description will now be made as to an operation of the power measurer 351. FIG. 4 is an illustrative partial diagram of the power measurer 351. Referring to FIG. 4, signals received from the base station are forward link channel signals converted to base-band signals. A multiplier 412 multiplies the received signals by PN (Pseudo-random Noise) codes and thereby outputs only pilot channel signals out of the entire signals. An accumulator 414 accumulates the pilot channel signals output from the multiplier 412 by a defined unit, and a squarer 416 squares the outputs of the accumulator 414 into signals in the form of energy. Here, the accumulator 414 can accumulate the pilot channel signals by the symbol unit. The accumulator 414 and the squarer 422 measure the power of the pilot channel signals and output the measured value as an energy Ec. That is, the output signal of the squarer 416 corresponds to the energy Ec per received pilot channel signal chip. In FIG. 4, a squarer 422 squares the received signals, and an accumulator 424 accumulates and averages the outputs of the squarer 422 by a defined unit. Here, the accumulator 424 accumulates the received signals by the same unit as the accumulator 414. Thus, the output signal of the accumulator 424 corresponds to the total receiving power spectral density Io of the entire signals. It should be noted that any of the outputs may be scaled by an appropriate constant factor.

Thereafter, the power measurer 351 calculates a ratio "Ec/Io" and outputs the strengths of the pilot channel signals. An access channel message generator 353 generates an access channel message including the strengths of the pilot channel signals output from the power measurer 351 and sends it to the base station on the reverse link.

An access channel message interpreter 313 at the base station analyzes the access channel message to extract the strengths of the pilot channel signals and sends the result to a transmission power controller 317. A memory 315 at the base station stores information including a ratio "(Ec/Ior)__pilot__tx" of transmission energy per pilot channel signal chip of the base station to the total transmission power spectral density of the entire signals, and a ratio "(Eb/Nt)__required" of required energy per signal bit to the noise power spectral density for each required data rate. The transmission power controller 317 receives the outputs of the access channel message interpreter 313 and the memory 315 of the base station and generates a channel gain control signal for controlling the initial transmission power for the forward link channel at the base station. A channel transmitter 319 determines the transmission power according to the channel gain control signal of the transmission power controller 317 and transmits signals for the corresponding channel. Here, the channel transmitter 319 can be a traffic channel transmitter or a control channel transmitter.

Referring to FIGS. 3 and 4, similarly, a pilot channel transmitter 311 at the base station transmits a pilot channel signal with fixed transmission power. The power measurer 351 at the mobile station measures the received power of the pilot channel signal, received from the pilot channel transmitter 311 of the base station, and the total received power of the entire signals. The power measurer 351 determines the ratio of the pilot channel received power to the total receiving power of the entire signals and output a strength of the pilot channel signal.

Now, a description will be made as to a method for measuring the strength of the pilot channel signal at the power measurer 351. The base station includes at least four independently operating processors. At least three of these processors trace multi-path components of a forward CDMA (Code Division Multiple Access) channel and demodulate them, and at least one processor is a searcher for searching and estimating the strength of the pilot channel signal at the offset of each PN sequence. The mobile station uses the searcher to sum the respective ratios "(Ec/Io) of the energy Ec per received pilot channel signal chip to the total received power spectral density Io of the entire signals (noise and signal) with respect to at most k (wherein k is the number of demodulation elements) available multi-path components, thereby obtaining the strength of the pilot channel signal represented by PS=(Ec/Io)__pilot__rx.

The access channel message generator 353 of the mobile station generates an access channel message to be sent to the base station. The access channel message includes a field "ACTIVE__PILOT__STRENGTH" for reporting the strength of the pilot channel signal. The access channel message generator 353 determines the value of this field as "−2×10 log$_{10}$PS", wherein the PS represents the strength of the pilot channel signal. If expressed in six bits, the value of the field less than zero is represented as "000000" and the value greater than "111111" is represented as "111111".

Referring to FIG. 4, as mentioned above, there is an illustrative partial diagram of the power measurer 351 in the mobile station for measuring the received powers of the pilot channel signal and the entire signals. The power measurer 351 multiplies received signals by PN codes and accumulates the despread signals in a symbol cycle. The power measurer 351 squares and averages the despread signals to obtain the power of the pilot channel signal. Non-despread signals are squared and averaged to obtain the power of the entire signals. The power measurer 351 includes measuring devices for k different PN sequence offsets and sums the measured values. It is possible to average the measured values for a relatively long time (i.e., multiple symbols) in order to enhance reliability of the measurement. For example, the ratio (Eb/Nt)__pilot__rx of the energy per pilot bit to the total noise received power spectral density Nt (Nt≈Io) can be obtained from the measured values accumulated for a length of one bit.

The access channel message generator 353 at the mobile station transmits the strength PS of the pilot channel signal output from the power measurer 351 to the base station on the access channel message. Then, the access channel message interpreter 313 at the base station receives the access channel message on the access channel and reads out information about the strength of the pilot channel signal from the access channel message. The transmission power controller 317 receives the information about the strength of the pilot channel signal and reads from the memory 315 of the base station the ratio "(Ec/Ior)__pilot__tx of the energy per pilot chip of the base station to the total transmission power spectral density, and the ratio "(Eb/Nt)__required" of a required energy per signal bit to the noise power spectral density corresponding to the required data rate. Based on the information, the transmission power controller 317 calculates a gain value of the initial transmission power for a new traffic or control channel.

Now, a description will be made in detail as to methods for determining the initial transmission power at the transmission power controller 317. In a first method, the transmission power controller 317 receives the ratio "(Ec/Io)__pilot__rx" of the strength of the pilot channel signal, i.e., the energy Ec per pilot chip to the total received power spectral density Io from the mobile station, to calculate Equation 1 below. With this, the transmission power controller 317 obtains a value of "(Ec/Ior)__traffic__tx" for a new channel by means of a table and controls the gain.

(Ior/(Ioc +No))__rx=1/[(Ec/Ior)__pilot__tx/(Ec/Io)__pilot__rx−1]　　　Equation 1:

In the expression, the "Ior" of (Ior/(Ioc+No))__rx represents the received power spectral density from a desired base station, the "Ioc" the received power spectral density of the other base stations, the "No" the noise power spectral density, Thus, the "(Ior/(Ioc +No))__rx" is the ratio of a desired base station signal received by the mobile station to interference and noise of the other base stations and represents information about the relative geometrical location of the desired based station with respect to the other base stations, estimated from the present location of the mobile station. Further, the "(Ec/Ior)__pilot__tx" is the ratio of the transmit energy per pilot chip of the base station to the total transmission power spectral density, and known to the base station. The term "table" used herein means (Ior/(Ioc +No))__rx to (Ec/Ior)__traffic__tx mapping by means of the existing theoretical or statistical performance curve. For most simplicity, the table can make the value of (Ec/Ior)_traffic_tx be in inverse proportion to the value of (Ior/(Ioc+No))_rx.

With the value of (Ec/Ior)_traffic_tx determined, a traffic power gain is calculated according to the following Equation 2.

$$\text{Gain}^2 = (\text{Ec/Ior})\_\text{traffic}\_\text{tx} \times \text{Ior} \quad \text{Equation 2:}$$

In the expression, the "Ior" represents the total transmission power spectral density of the base station.

Figure 7:
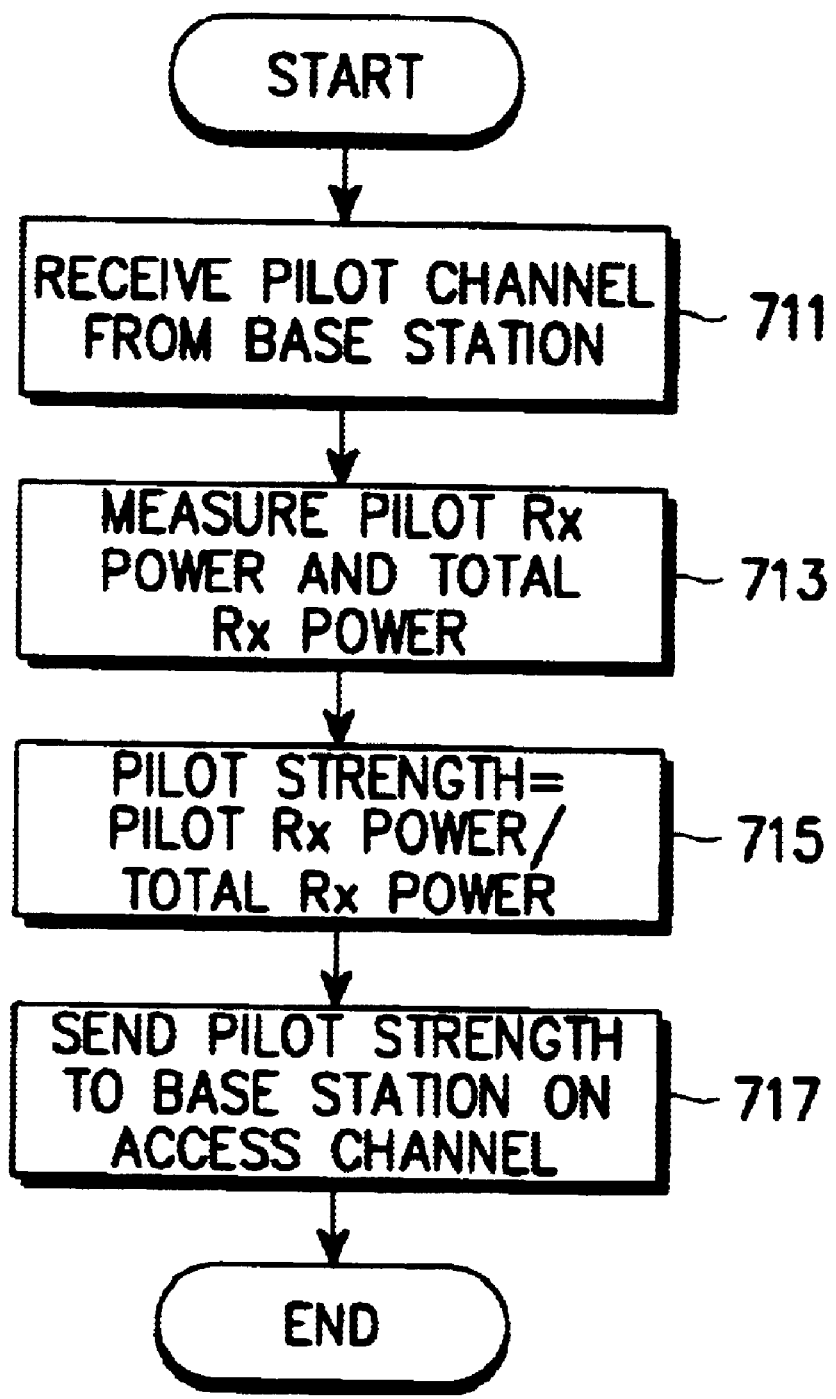
FIG. 7 is a flow chart illustrating a procedure at the mobile station for determining the initial transmission power for a forward link channel using the strength of the forward link pilot channel signal in the mobile communications system.

FIG. 7 is a flow chart showing a procedure at the mobile station for determining the initial transmission power using the strength of the forward pilot channel signal in accordance with the first embodiment of the present invention. Referring to FIG. 7, the mobile station receives a pilot channel signal in step 711 and measures the received power of the pilot channel signal and the total received power of the entire signals in the same manner as described above, in step 713. Then, the mobile station calculates the strength of the pilot channel signal as the ratio of the pilot channel received power to the total received power of the entire signals in step 715 and transmits the strength value of the pilot channel signal to the base station on an access channel message in step 717.

Figure 8:
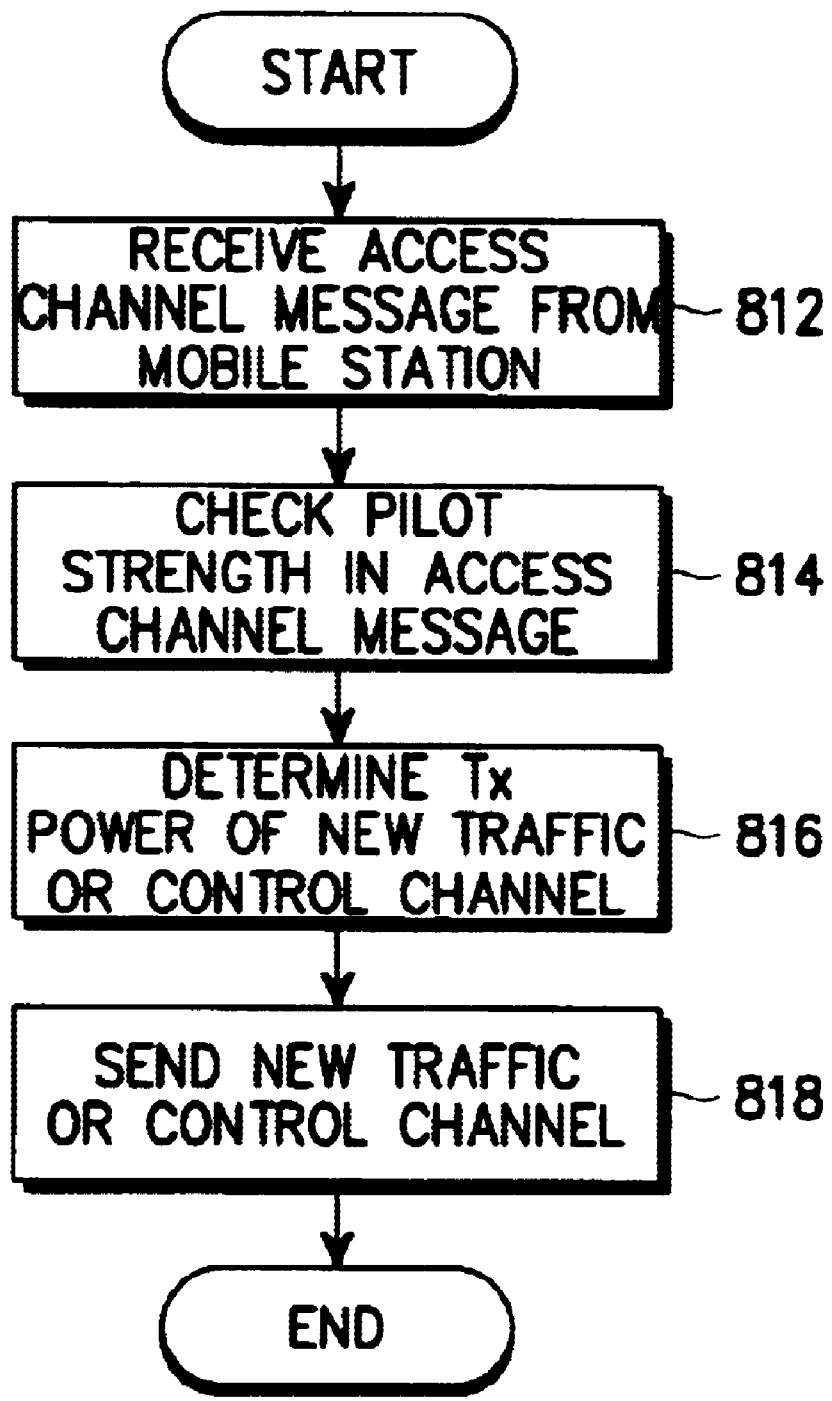
FIG. 8 is a flow chart illustrating a procedure at the base station for determining the initial transmission power for a forward link channel using the strength of the forward link pilot channel signal in the mobile communications system.

FIG. 8 is a flow chart showing a procedure at the base station for determining the initial transmission power using the strength of the forward pilot channel signal in accordance with the first embodiment of the present invention. Referring to FIG. 8, the base station receives the access channel message from the mobile station in step 812 and checks the strength value of the pilot channel signal included in the access channel message in step 814. The base station determines the initial transmission power of a forward link channel signal using the strength value of the pilot channel signal in step 816 and transmits the forward link channel signal with the transmission power as determined above, in step 818. Here, the channel transmitter used herein can be a traffic channel transmitter or a control channel transmitter.

In a second method, the mobile station reports to the base station the ratio (Eb/Nt)_pilot_rx of the energy Eb per pilot channel signal bit to the total received noise power spectral density Nt and determines power in proportion to the required value (Eb/Nt)_required for a new channel. Because the ratio (Eb/Nt)_pilot_rx can be measured similarly to the ratio (Ec/Io)_pilot_rx, the mobile station calculates the ratio (Eb/Nt)_pilot_rx of the received pilot channel signal powers accumulated for one bit cycle to the power spectral density of non-despread noise signals. The value thus calculated is the strength of the pilot channel signal and sent to the base station on the access channel message.

Then, the base station compares the value (Eb/Nt)_pilot_rx for the strength of the pilot channel signal with the required value (Eb/Nt)_required for a forward link channel, to determine the initial transmission power. That is, the base station determines the initial transmission power for the forward link channel (traffic or control channel) as (transmission power of pilot channel signal)+(Eb/Nt)_required−(Eb/Nt)_pilot_rx. This can be expressed by the Equation 3.

$$\text{Initial transmission power} = \text{Pilot transmission power} + (\text{Eb/Nt})\_\text{required} - (\text{Eb/Nt})\_\text{pilot}\_\text{rx} \quad \text{Equation 3:}$$

Here, the initial transmission power is equal to the squared traffic (or control) channel gain and the pilot transmission power is the squared pilot channel gain. The traffic (or control) channel transmitter used herein sends a traffic (or control) channel signal with power according to the traffic (or control) channel gain value received from the transmission power controller.

In a second embodiment of the present invention, a mobile station transmits a reverse link pilot channel signal with variable power and reports the transmission power value of the reverse link pilot channel signal to a base station on an access channel. The base station determines the initial transmission power for transmitting a new traffic or control channel based on the transmission power value.

Figure 5:
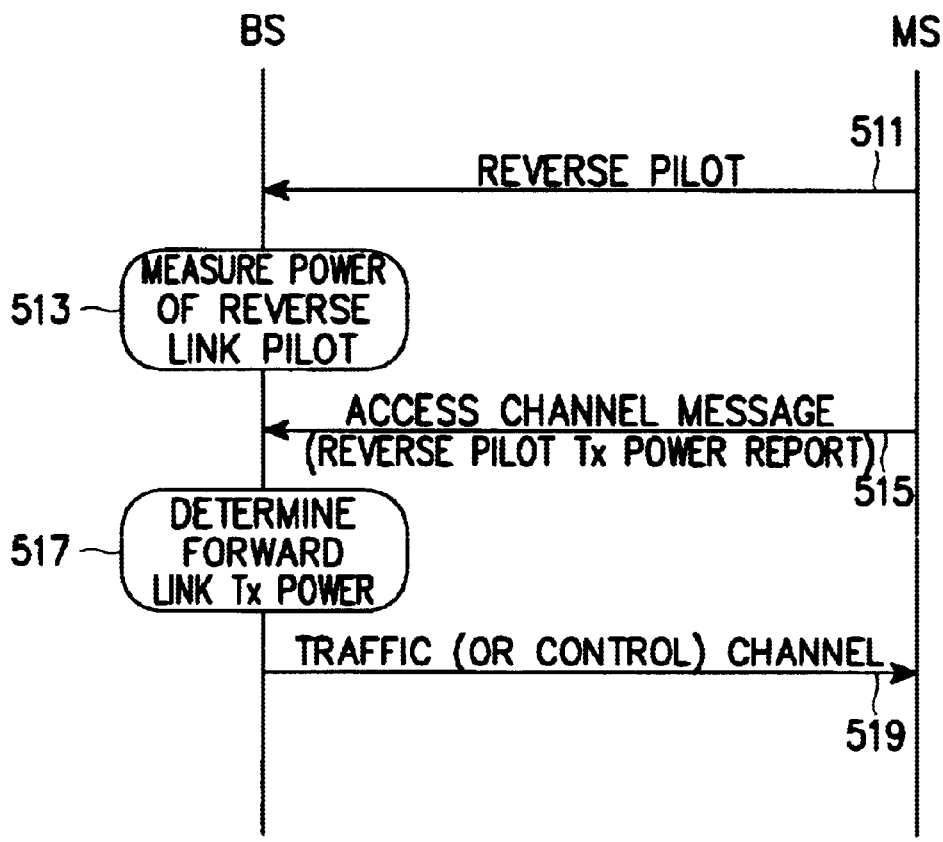
FIG. 5 is a diagram illustrating a procedure for determining the initial transmission power using the strength of a reverse link pilot channel signal in the mobile communications system.

FIG. 5 is a diagram illustrating a procedure for determining the initial transmission power for a traffic or control channel signal using the strength of the reverse link pilot channel signal. Referring to FIG. 5, a mobile station sends a reverse link pilot channel signal to a base station in step 511. Here, the reverse link pilot channel signal is transmitted with variable power. Then, the base station receives the reverse link pilot channel signal from the mobile station and measures the received power for the reverse link pilot channel signal, in step 513. Also, the mobile station sends the transmission power value of the reverse link pilot channel signal with an access channel message to the base station, in step 515. Here, the mobile station can send the reverse link pilot channel signal and the access channel message sequentially or simultaneously.

In step 517, the base station subtracts the received power value of the reverse link pilot channel signal measured in step 513 from the transmission power value of the reverse link pilot channel signal included in the access channel message received from the mobile station, to calculate an attenuated strength of the reverse link pilot channel signal. Here, the power is represented by dB. The base station can determines the initial transmission power of a forward link channel signal to be proportional to the attenuated strength of the reverse link pilot channel signal. That is, the base station can determine the initial transmission power to be higher with an increase in the attenuated strength of the reverse link pilot channel signal.

Channel transmitters at the base station is controlled in regard to their transmission power according to the initial transmission power determined above, and channel receivers at the mobile station can receive signals from such forward link channel transmitters.

Figure 6:
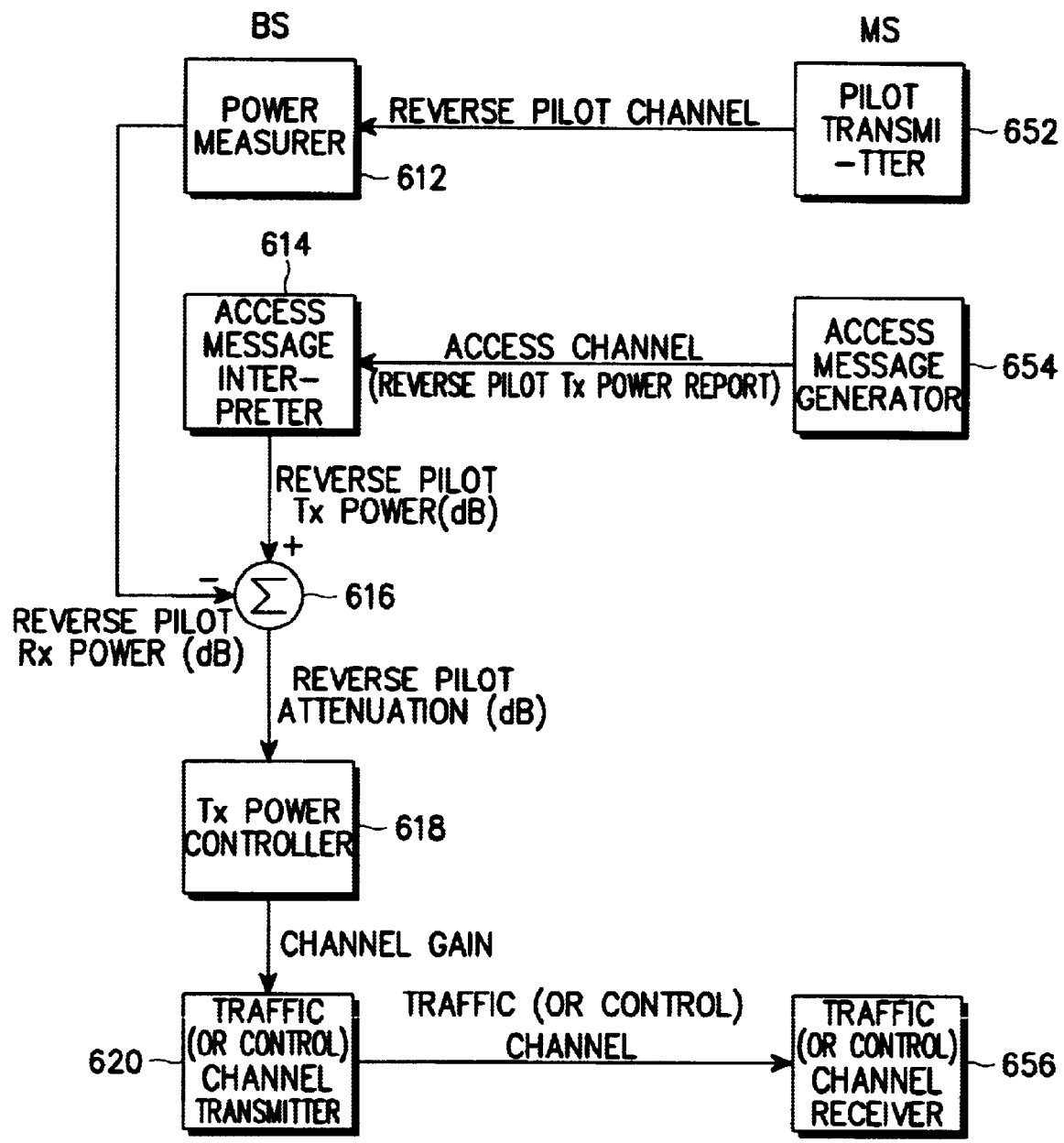
FIG. 6 is a schematic diagram of a device for determining the initial transmission power using the strength of the reverse link pilot channel signal according to the procedure of FIG. 5.

FIG. 6 is a schematic diagram of a device for determining the initial transmission power using the strength of a reverse link pilot channel signal at the base station and the mobile station in a mobile communications system. Referring to FIG. 6, at the mobile station, a reverse link pilot channel transmitter 652 sends a reverse link pilot channel signal to the base station and an access channel generator 654 sending the transmission power for the reverse link pilot channel signal to the base station on an access channel message. At the base station, a power measurer 612 measures the receiving power of the reverse link pilot channel signal received from the reverse link pilot channel transmitter 652. An access channel message interpreter 614 receives the access channel message from the access channel message generator 654 to analyze the transmission power of the reverse link pilot channel signal. A subtracter 616 at the base station subtracts the receiving power of the reverse link pilot channel signal from the transmission power of it. A transmission power controller 618 determines the initial transmission power for a channel transmitter 620 on the forward link, based on the output of the subtracter 616. Therefore, the channel transmitter 620 can send a forward link channel signal with the initial transmission power as determined above.

Next, reference will be made in connection with FIG. 6 as to a procedure for determining the initial transmission power for a forward link channel in accordance with the second embodiment of the present invention. The reverse link pilot channel transmitter 652 at the mobile station sends a reverse link pilot channel signal with variable power to the base station. The power measurer 612 at the base station measures the received power of the reverse link pilot channel signal from the reverse link pilot channel transmitter 652. Also, the access channel message generator 654 at the mobile station sends the transmission power value of the reverse link pilot channel signal to the base station on an access channel message. Then, the access channel message interpreter 614 at the base station receives the access channel message and analyzes the transmission power information of the reverse link pilot channel signal.

The subtracter 616 receives the transmission power value of the reverse link pilot channel signal from the access channel message interpreter 614 and the received power value of the reverse link pilot channel signal measured at the power measurer 612 and calculates a difference between them as an attenuated value of the reverse link pilot channel signal. The transmission power controller 618 at the base station determines the initial transmission power for a new forward link channel transmitter based on the attenuated value of the reverse link pilot channel signal received from the subtracter 616. Here, the transmission power controller 618 determines the initial transmission power for the forward link channel to be proportional to the attenuated value of the reverse link pilot channel signal. The channel transmitter 620 determines the initial transmission power for a signal to be transmitted, according to the power gain value received from the transmission power controller 618. Here, the channel transmitter 620 can be a traffic or control channel transmitter.

Figure 9:
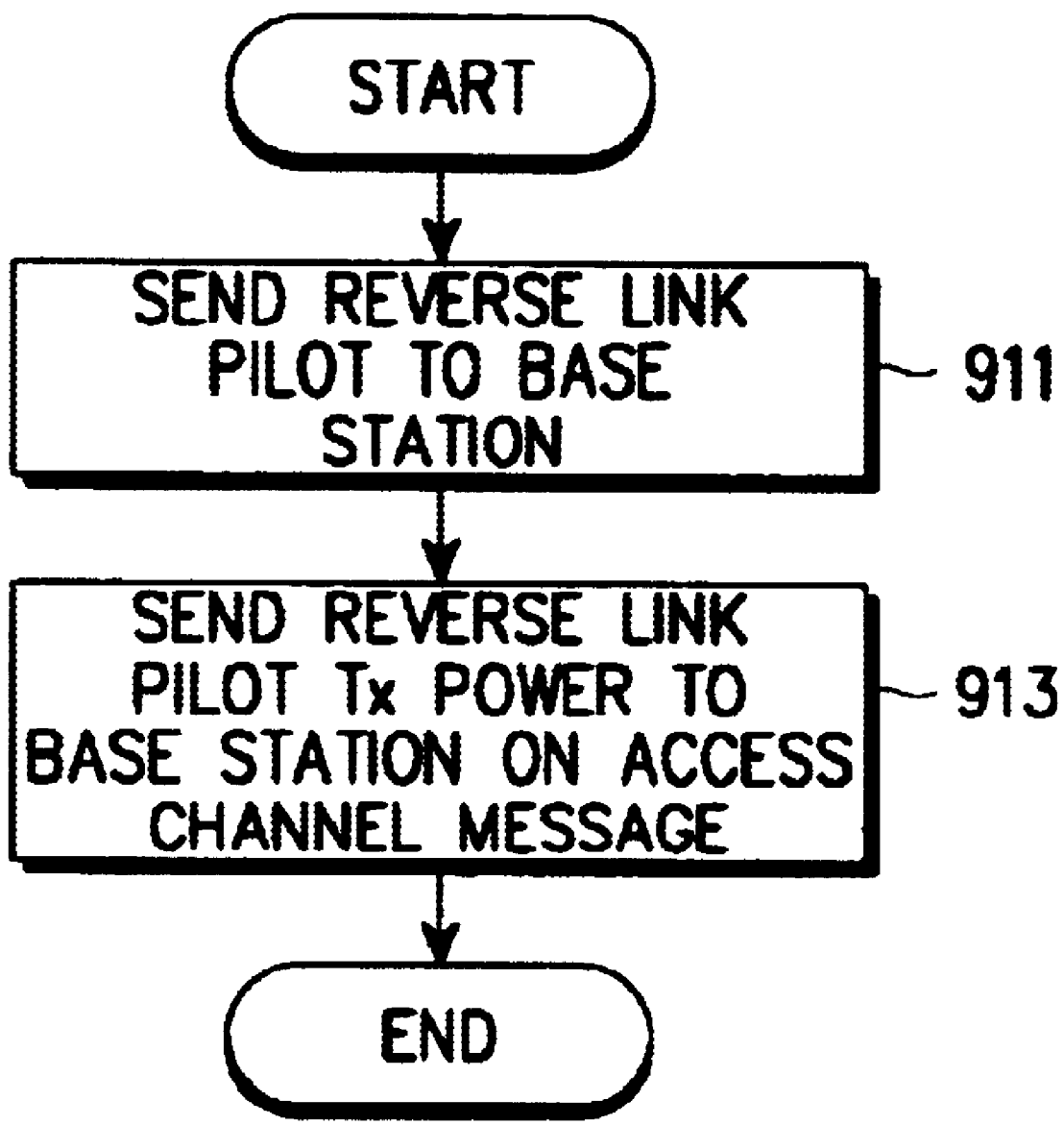
FIG. 9 is a flow chart illustrating a procedure at the mobile station for determining the initial transmission power fir a forward link channel using the strength of the reverse link pilot channel signal in the mobile communications system.

FIG. 9 is a flow chart illustrating a procedure at the mobile station for determining the initial transmission power for a forward link channel transmitter using the strength of a reverse link pilot channel signal in accordance with the second embodiment of the present invention. Referring to FIG. 9, the mobile station sends a reverse link pilot channel signal to the base station with variable power in step 911 and concurrently or within a short delay sends the transmission power value of the reverse link power channel signal to the base station on an access channel message in step 913.

Figure 10:
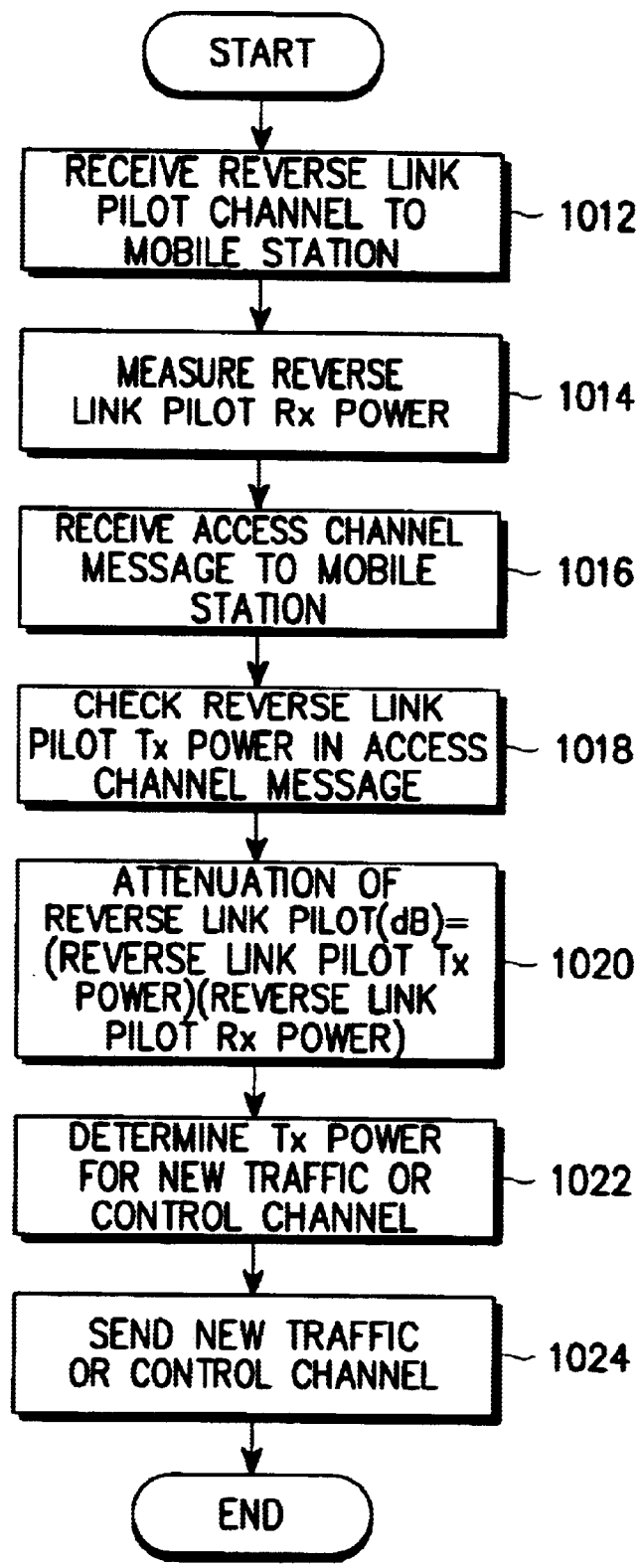
FIG. 10 is a flow chart illustrating a procedure at the base station for determining the initial transmission power for a forward link channel using the strength of the reverse link pilot channel signal in the mobile communications system.

FIG. 10 is a flow chart illustrating a procedure at the base station for determining the initial transmission power for a forward link channel transmitter using the strength of a reverse link pilot channel signal in accordance with the second embodiment of the present invention. Referring to FIG. 10, the base station receives a reverse link pilot channel signal in step 1012 and measures the received power of the reverse link pilot channel signal in step 1014. Upon receiving an access channel message including the transmission power of the reverse link pilot channel from the mobile station in step 1016, the base station checks the transmission power value of the reverse link pilot channel signal included in the access channel message in step 1018. Then, the base station subtracts the received power of the reverse link pilot channel signal from the transmission power of it to obtain an attenuated value of the reverse link pilot channel signal in step 1020. The base station determines the initial transmission power of a specified forward link channel transmitter using the attenuated value of the reverse link pilot channel signal in step 1022, and sends a forward link channel signal to the mobile station with the initial transmission power thus determined in step 1024. Here, the forward link channel can be a traffic channel or a control channel as described above.

In addition to the above-described embodiments and methods, the base station can determine the initial transmission power of a forward link channel in consideration of the data rate for data to be transmitted. That is, the base station checks the data rate required for the data to be transmitted at the forward link channel transmitter and determines the initial transmission power to be higher with an increase in the data rate.

Alternatively, the base station can determine the initial transmission power for a forward link channel transmitter as a weighted combination of the power determining factors used in the described embodiments and methods. Other offset values may also be used to calibrate the power level.

In a case where the initial transmission power of a forward link channel transmitter is determined according to the above-described embodiments and methods, the initial transmission power for the forward link channel transmitter that exceeds a predetermined threshold must be determined as the upper threshold. This is to avoid the situation that the initial transmission power determined above works as an interference signal for the other channel transmitters.

As described above, the base station determines the initial transmission power for a specified forward link channel transmitter adaptively according to a channel condition when transmitting a new traffic or control channel signal in a mobile communications system. As a result, the interference of the forward channel transmitters can be reduced, with enhanced receiving performance of the mobile station and increasing the utility efficiency of the transmission power for the base station.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for determining an initial transmission power for a forward link channel transmitter of a base station in a mobile communications system, comprising the steps of:

measuring, at a mobile station, a strength of a specified forward link channel received from the base station and sending information indicative of the strength of the specified forward link channel to the base station, wherein the strength is measured according to a ratio of the received power of the specified forward link channel to the received power of other channels; and determining, at the base station, the initial transmission power for the specified forward link channel based on information received from the mobile station, including the ratio of the received power of the specified forward link channel to the received power of the other channels, and using the determined transmission power for controlling an initial transmission power for an other forward link channel.

2. The method as claimed in claim 1, wherein the specified forward link channel is a pilot channel.

3. The method as claimed in claim 2, wherein the step of measuring comprises the substeps of:

despreading signals received from the base station to measure energy per pilot channel chip;

measuring total received power spectral density of the signals received from the base station; and determining the strength of the pilot channel signal according to a ratio of the energy per pilot chip to the total received power spectral density.

4. The method as claimed in claim 3, wherein the step of determining the initial transmission power comprises the substeps of:
   calculating, at the base station, a ratio of a desired base station signal to interference and noise for other base stations using the ratio of the transmit energy per pilot channel chip to the total transmit power spectral density and the strength of the pilot channel signal; and
   determining the initial transmission power for the other forward link channel from the ratio of the desired base station signal to the interference and noise for the other base stations.

5. The method as claimed in claim 3, wherein the step (2) of determining the initial transmission power comprises the steps of:
   receiving from the mobile station the ratio of the energy per pilot channel chip to the total receiving power spectral density as the strength of the pilot channel signal; and
   receiving the strength of the pilot channel signal and determining the initial transmission power to be proportional to a difference between the ratio of a required energy per the forward link channel signal bit to noise power spectral density and the strength of the pilot channel signal.

6. The method as claimed in claim 1, wherein the initial transmission power is an initial transmission power for a traffic channel.

7. The method as claimed in claim 1, wherein the initial transmission power is an initial transmission power for a control channel.

8. A method for determining an initial transmission power for a forward link channel transmitter of a base station in a mobile communications system, comprising the steps of:
   sending, at a mobile station, information indicating a specified reverse link channel signal and a transmission power of the specified reverse link channel signal;
   measuring, at the base station, a received power of the specified reverse link channel signal and determining the initial transmission power to be proportional to a difference between the transmission power included in the information received from the mobile station and the received power; and
   sending a forward link channel signal with the initial transmission power.

9. The method as claimed in claim 8, wherein the specified reverse link channel is a pilot channel.

10. A mobile communications system for determining an initial transmission power for a forward link channel, comprising:
    a mobile station for measuring a received power of a specified forward link channel and a received power of other channels and detecting a strength of the specified forward link channel according to a ratio of the received power of the specified forward link channel to the received power of the other channels; and
    a base station for receiving the strength of the specified forward link channel, determining the initial transmission power according to the ratio and using the determined transmission power for controlling an initial transmission power for an other forward link channel.

11. The system as claimed in claim 10, wherein the specified forward link channel is a pilot channel.

12. The system as claimed in claim 11, wherein the mobile station comprises:
    a power measurer comprising a pilot power measurer for despreading signals received from the base station and measuring energy per pilot channel chip, a total power measurer for measuring total power spectral density of signals received from the base station, and a pilot channel strength determiner for determining a strength of the pilot channel according to a ratio of the energy per pilot channel chip to the total received power spectral density; and
    an access channel transmitter for sending the strength of the pilot channel through a reverse link access channel.

13. The system as claimed in claim 11, wherein the base station comprises:
    a pilot channel transmitter for sending the pilot channel with fixed power;
    a memory for storing the ratio of the transmit energy per pilot chip to the total transmission power spectral density;
    a transmission power controller for calculating a ratio of a desired base station signal to interference and noise of other base stations using the strength of the pilot channel received from the mobile station, and determining an initial transmission power for the other forward link channel from the ratio of the desired base station signal to interference and noise of the other base stations; and
    a forward link channel transmitter for transmitting a channel signal with the initial transmission power for the other forward link channel as determined by the transmission power controller.

14. The system as claimed in claim 11, wherein the base station comprises:
    an access channel receiver for receiving the ratio of energy per pilot channel bit to total received noise power spectral density from the mobile station;
    a memory for storing a ratio of required energy per forward link pilot channel bit to the total received noise power spectral density;
    a transmission power controller for determining the initial transmission power by subtracting the ratio of the required energy per forward link pilot channel bit to the total received noise power spectral density and using the determined initial transmission power for the pilot channel; and
    a forward link channel transmitter for transmitting a channel signal via the pilot channel with the initial transmission power determined by the transmission power controller.

15. The system as claimed in claim 10, wherein the initial transmission power is an initial transmission power for a traffic channel.

16. The system as claimed in claim 10, wherein the initial transmission power is an initial transmission power for a control channel.

17. A device for determining initial transmission power for a forward link channel in a mobile communications system, comprising:
    a base station for sending a specified reverse link channel signal and transmission power for the specified reverse link channel signal,
    wherein the base station measures received power of the specified reverse link channel signal, subtracts the measured received power from the transmission power of the specified reverse link channel to determine the initial transmission power, and uses the determined transmission power for controlling an initial transmission power for an other forward link channel.

18. The device as claimed in claim 17, wherein the specified reverse link channel is a pilot channel.

19. The device as claimed in claim 18, wherein the base station comprises:
   a pilot transmitter for transmitting the reverse link pilot channel signal; and
   an access channel transmitter for transmitting the transmission power of the reverse link pilot channel via a reverse link access channel message.

20. The device as claimed in claim 19, wherein the base station comprises:
   a power measurer for measuring the received power of the reverse link pilot channel;
   an access channel receiver for extracting the transmission power of the reverse link pilot channel from the reverse link access channel message;
   a subtracter for subtracting the received power of the reverse link pilot channel from the transmission power of the reverse link pilot channel;
   a transmission power controller for determining the initial transmission power of the reverse link pilot channel according by determining a difference between the transmission power and the received power of the reverse link pilot channel; and
   a forward link channel transmitter for transmitting a channel signal with the initial transmission power determined for the reverse link pilot channel by the transmission power controller.

21. The device as claimed in claim 19, wherein the initial transmission power is an initial transmission power for a traffic channel.

22. The device as claimed in claim 19, wherein the initial transmission power is an initial transmission power for a control channel.

23. A method for determining an initial transmission power for a forward link channel in a mobile communication system, comprising the steps of:
   at a mobile station, despreading a forward link channel signal received from a base station to measure energy per pilot channel chip and total received power spectral density of signals received from the base station, determining the strength of a pilot channel signal as (Ec/Io)_pilot_rx and sending the calculated strength of the pilot channel signal to a reverse link control channel;
   at the base station, receiving the strength of the pilot channel signal and calculating the ratio (Ior/(Ioc+No))_rx of a desired base station signal to interference and noise of other base stations using a ratio (Ec/Ior)_pilot_tx of the transmit energy Ec per pilot channel chip to total transmission power spectral density Ior, and the strength of the pilot channel signal according to the equation:

$$(Ior/(Ioc+No))\_rx=1/[(Ec/Ior)\_pilot\_tx/(Ec/Io)\_pilot\_rx-1]$$

wherein No represents noise spectral density;
   calculating a ratio (Ec/Ior)_traffic_tx of the energy Ec per a new traffic channel chip to the total transmission power spectral density Ior from the calculated ratio of the desired base station signal to the interference and noise of the other base stations using a mapping table, and determining a traffic channel power gain according to the equation:

$$Gain^2=(Ec/Ior)\_traffic\_tx\times Ior$$

wherein Ior represents the total transmission power spectral density of the base station; and
   sending signals via the forward link channel with the initial transmission power.

24. The method as claimed in claim 22, wherein the value (Ec/Ior)_traffic_tx is in inverse proportion to the value (Ior/(Ioc+No))_rx.

25. A method for determining an initial transmission power for a forward link channel in a mobile communications system, comprising the steps of:
   at a mobile station, measuring energy Ec per pilot channel bit of a forward channel signal received from a base station and total received noise power spectral density Nt to determine a strength of a pilot channel signal as (Eb/Nt)_pilot_rx and sending the strength of the pilot channel signal to a reverse link control channel;
   at the base station, receiving the strength of the pilot channel signal, comparing the strength of the pilot channel signal with a ratio (Eb/Nt)_required of required energy Eb per forward link channel signal bit to noise power spectral density Nt, and determining the initial transmission power according to the equation expressed by $$\text{Initial transmission power}=\text{Pilot transmission power}+(Eb/Nt)\_required-(Eb/Nt)\_pilot\_rx;\text{and}$$

sending signals via the forward link channel with the determined initial transmission power.

26. A method for determining an initial transmission power for a forward link channel signal at a base station in a mobile communications system, comprising the steps of:
   sending the forward link channel signal via a specified forward link channel and receiving information indicating a strength of the forward link channel signal from a mobile station;
   determining the initial transmission power for the forward link channel according to the information about the strength of the forward link channel signal, and according to one of a total transmission power spectral density and the total noise power spectral density; and
   sending signals via the specified forward link channel with the determined initial transmission power.

27. The method as claimed in claim 26, wherein the specified forward link channel is a pilot channel.

28. The method as claimed in claim 27, wherein the step of determining the initial transmission power comprising the substeps of:
   calculating a ratio of a desired base station signal to interference and noise of other base stations, using a ratio of the transmit energy per pilot channel chip to a total transmission power spectral density and the strength of the pilot channel signal received from the mobile station; and
   determining the initial transmission power for the forward link channel signal from the calculated ratio of the desired base station signal to the interference and noise of the other base stations.

29. The method as claimed in claim 27, wherein the step of determining the initial transmission power comprising the substeps of:
   receiving a ratio of energy per pilot channel bit to a total noise power spectral density as the strength of the pilot channel signal from the mobile station; and
   receiving the strength of the pilot channel signal and determining the initial transmission power for the forward link channel signal to be proportional to a difference between a ratio of energy per required forward channel bit to the total noise power spectral density and the strength of the pilot channel signal.

30. The method as claimed in claim 26, wherein the initial transmission power is an initial transmission power for a traffic channel.

31. The method as claimed in claim 26, wherein the initial transmission power is an initial transmission power for a control channel.

32. A method for communicating a channel in a mobile communications system, comprising the steps of:
   receiving a specified forward link channel signal;
   despreading the specified forward link channel signal to measure energy per forward link channel chip and measuring total received power spectral density of all forward link signals received;
   determining a received power value according to a ratio of the energy per forward link channel chip for the specified forward link channel signal and the total receiving power spectral density; and
   sending the determined received power value of the specified forward link channel signal via a specified reverse link common channel message.

33. The method as claimed in claim 32, wherein the specified forward link channel is a pilot channel.

34. A method for determining initial transmission power for a forward link channel signal at a base station in a mobile communications system, comprising steps of:
   receiving information indicating a specified reverse link channel signal and the transmission power of the revere link channel signal from a mobile station;
   measuring, at the base station, the received power of the specified reverse link channel signal and determining the initial transmission power to be in proportion to a difference between the transmission power of the specified reverse link channel and the measured received power of the specified reverse link channel; and
   sending the forward link channel signal with the determined initial transmission power.

35. The method as claimed in claim 34, wherein the specified reverse link channel is a reverse link pilot channel and a channel for receiving the information about the transmission power is an access channel.

36. A method for communication of a channel at a mobile station in a mobile communications system, wherein a base station receives information about a specified channel from the mobile station and determines an initial transmission power for a forward link channel, the method comprising the steps of:
   sending a specified reverse link channel signal via a first channel;
   sending information about the transmission power of the specified reverse link channel signal via a common channel, wherein the common channel is not the first channel; and
   determining a difference between the transmission power of the specified reverse link channel signal and the reception power of the specified reverse link channel signal to determine the initial transmission power for the forward link channel,
   wherein the initial transmission power for the forward link channel is determined to be proportional to the difference between the transmission power of the specified reverse link channel signal and the reception power of the specified reverse link channel signal.

37. The method as claimed in claim 36, wherein the specified revere link channel is a reverse link pilot channel and the common channel is an access channel.

38. A device for determining an initial transmission power for a forward link channel signal at a base station in a mobile communications system, comprising:
   a pilot channel transmitter for transmitting a pilot channel signal via a pilot channel;
   a common channel receiver for receiving information indicating a strength of a specified channel from a mobile station, wherein the specified channel in not the pilot channel;
   a transmission power controller for controlling the initial transmission power for the forward link channel signal according to the received information about the strength of the specified channel by determining a difference between the transmission power of the pilot channel signal and the reception power of the specified channel signal; and
   a channel transmitter for transmitting the forward link channel signal with the determined initial transmission power,
   wherein the initial transmission power for the forward link channel signal is controlled proportional to the difference between the transmission power of the pilot channel signal and the reception power of the specified channel signal.

39. The device as claimed in claim 38, wherein the common channel receiver is an access channel and the channel transmitter is a control channel.

40. The device as claimed in claim 38, wherein the common channel receiver is an access channel and the channel transmitter is a traffic channel.

41. A device for communicating a channel at a mobile station in a mobile communications system, comprising:
   a pilot channel receiver for receiving a specified forward link channel signal;
   a power measurer for despreading the specified forward link channel signal to measure energy per forward link channel chip, measuring total received power spectral density of all received signals, and determining received power of the specified forward link channel signal according to a ratio of the energy per a specified channel signal chip to the total received power spectral density; and
   a common channel transmitter for transmitting the received power of the specified forward link channel signal via a specified forward link common channel message.

42. A device for determining an initial transmission power for a forward link channel signal at a base station in a mobile communications system, the device comprising:
   a power measurer for receiving a specified reverse link channel signal from a mobile station and measuring a received power of the specified reverse link channel signal;
   a common channel receiver for receiving information indicating a transmission power of the specified reverse link channel signal;
   a transmission power controller for determining the initial transmission power to be proportional to a difference between the transmission power and the measured received power of the specified reverse link channel signal; and
   a channel transmitter for sending the forward link channel signal with the determined initial transmission power.

43. A device for communicating a channel at a mobile station in a mobile communications system, wherein a base station receives information about a specified channel from the mobile station and determines initial transmission power for a forward link channel, the device comprising:

a reverse link pilot channel transmitter for transmitting a specified reverse link channel signal via a first channel;

an access channel transmitter for transmitting via an access channel transmission power of the specified reverse link channel signal via a message, wherein the access channel is not the first channel; and a transmission power controller for determining a difference between the transmission power of the specified reverse link channel signal and the reception power of the specified reverse link channel signal to determine the initial transmission power for the forward link channel, wherein the initial transmission power for the forward link channel is controlled proportional to the difference between the transmission power of the specified reverse link channel signal and the reception power of the specified reverse link channel signal.

* * * * *